(12) United States Patent
Hierl et al.

(10) Patent No.: US 11,120,514 B2
(45) Date of Patent: Sep. 14, 2021

(54) DOMESTIC POWER PLANT AND METHOD FOR OPERATING A DOMESTIC POWER PLANT

(71) Applicant: HPS HOME POWER SOLUTIONS GMBH, Berlin (DE)

(72) Inventors: Andreas Hierl, Berlin (DE); Dirk Radue, Berlin (DE); Gunnar Schneider, Wildau (DE); Uwe Benz, Uhldingen (DE); Kevin Schroder, Berlin (DE); Zeyad Abul-Ella, Berlin (DE)

(73) Assignee: HPS HOME POWER SOLUTIONS GMBH

(*) Notice: Subject to any disclaimer, the term of this patent is extended or adjusted under 35 U.S.C. 154(b) by 284 days.

(21) Appl. No.: 15/777,973

(22) PCT Filed: Nov. 24, 2016

(86) PCT No.: PCT/EP2016/078691
§ 371 (c)(1),
(2) Date: Feb. 4, 2019

(87) PCT Pub. No.: WO2017/089469
PCT Pub. Date: Jun. 1, 2017

(65) Prior Publication Data
US 2019/0385245 A1 Dec. 19, 2019

(30) Foreign Application Priority Data
Nov. 25, 2015 (DE) ...................... 10 2015 120 454.1

(51) Int. Cl.
*F24D 5/02* (2006.01)
*H01M 10/66* (2014.01)
(Continued)

(52) U.S. Cl.
CPC ............... *G06Q 50/06* (2013.01); *C25B 1/04* (2013.01); *F24D 5/02* (2013.01);
(Continued)

(58) Field of Classification Search
CPC .. G06Q 50/06; H01M 10/613; H01M 10/627; H01M 10/66; H01M 8/04014;
(Continued)

(56) References Cited

U.S. PATENT DOCUMENTS 6,627,340 B1 * 9/2003 Ovshinsky ............ H01M 8/065
429/421
2002/0062650 A1 5/2002 Dukhan et al.
(Continued)

FOREIGN PATENT DOCUMENTS

CN 102340045 A 2/2012
EP 1 475 577 A2 11/2004
(Continued)

OTHER PUBLICATIONS

Office Action dated Oct. 22, 2020 issued by the European Patent Office in corresponding Application No. EP 16800990.0, 8 pages.
(Continued)

*Primary Examiner* — Jayne L Mershon
(74) *Attorney, Agent, or Firm* — Ware, Fressola, Maguire & Barber LLP

(57) ABSTRACT

A domestic power plant has a housing which has an external air connection and an output air connection, and comprises a ventilation device with a heat exchanger. The ventilation device is connected to the external air connection such that external air can flow in a first air tract via the heat exchanger, or via an external air bypass past the heat exchanger, into a feed air tract of the domestic power plant. The feed air tract runs at least partially within the housing. The domestic power plant also has an exhaust air tract in which an air
(Continued)

volume flow, brought about by the ventilation device, can be propagated within the housing and a fuel cell unit.

20 Claims, 5 Drawing Sheets

(51) Int. Cl.
    *H01M 10/627*    (2014.01)
    *H01M 10/613*    (2014.01)
    *G06Q 50/06*     (2012.01)
    *C25B 1/04*      (2021.01)
    *H01M 8/04014*   (2016.01)
    *H01M 8/0662*    (2016.01)
    *H01M 8/247*     (2016.01)
    *H01M 16/00*    (2006.01)
    *H02J 3/32*      (2006.01)
    *H01M 8/04119*   (2016.01)

(52) U.S. Cl.
    CPC ... *H01M 8/04014* (2013.01); *H01M 8/04156* (2013.01); *H01M 8/0662* (2013.01); *H01M 8/247* (2013.01); *H01M 10/613* (2015.04); *H01M 10/627* (2015.04); *H01M 10/66* (2015.04); *H01M 16/006* (2013.01); *H02J 3/32* (2013.01); *F24D 2200/19* (2013.01); *F24D 2200/29* (2013.01); *F24D 2200/31* (2013.01); *F24H 2240/10* (2013.01); *H01M 2250/10* (2013.01)

(58) Field of Classification Search
    CPC ........... H01M 8/04156; H01M 8/0662; H01M 8/247; H01M 16/006; H02J 3/32; C25B 1/04; F24D 5/02
    See application file for complete search history.

(56) References Cited

U.S. PATENT DOCUMENTS

2015/0010785 A1*   1/2015   Ogawa ............. H01M 8/04164
                                                                             429/9
2016/0248137 A1*   8/2016   Curien ............. H01M 8/04373

FOREIGN PATENT DOCUMENTS

| WO | 99/57335 A1 | 11/1999 |
| WO | 2010/075602 A1 | 7/2010 |
| WO | WO2012113932 | * 3/2012 |
| WO | 2012/113932 A2 | 8/2012 |

OTHER PUBLICATIONS

Chinese Office Action dated Mar. 16, 2021 issued by CNIPO in corresponding Application No. 201680079724.7, 8 pages.

* cited by examiner

DOMESTIC POWER PLANT AND METHOD FOR OPERATING A DOMESTIC POWER PLANT

CROSS REFERENCE TO RELATED APPLICATIONS

This application is the U.S. National Stage of International Application Number PCT/EP2016/078691 filed on Nov. 24, 2016, which application claims priority under 35 USC § 119 to German Patent Application No. 10 2015 120 454.1 filed on Nov. 25, 2015. Both applications are hereby incorporated by reference in their entirety.

TECHNICAL FIELD

The present invention relates to a domestic power plant as well as to a method for operating a domestic power plant.

BACKGROUND OF THE INVENTION

Domestic power plants are generally known from prior art and serve the energy provision of a residential building with electricity and/or heat.

SUMMARY OF THE INVENTION

It is the object of the present invention to provide an energetically advantageous and safe domestic power plant. It is also an object of the invention to specify a method for operating a domestic power plant.

With regard to the domestic power plant, the object is achieved by means of a domestic power plant, in particular for self-sufficient energy provision of a residential building with electricity and/or heat, comprising a housing which has an external air connection and an output air connection, a ventilation device with a heat exchanger, wherein the ventilation device is connected to the external air connection such that external air can flow in a first air tract via the heat exchanger, or via an external air bypass past the heat exchanger, into a feed air tract of the domestic power plant, wherein the feed air tract runs at least partially within the housing.

The domestic power plant also has an exhaust air tract in which an air volume flow, brought about by the ventilation device, can be propagated within the housing, a fuel cell unit which is preferably arranged within the housing and is integrated into the exhaust air tract such that undesired gas released in the fuel cell unit is diluted by the air volume flow and can be removed together with waste heat from the fuel cell unit, and a storage battery unit which is preferably arranged within the housing and is integrated into the exhaust air tract such that undesired gas released in the storage battery unit is diluted by the air volume flow and can be removed together with waste heat from the fuel cell unit.

In addition, the domestic power plant has a second air tract which is connected to the exhaust air tract, wherein the second air tract of the ventilation device is thermally coupled to the first air tract via the heat exchanger of the ventilation device such that it is possible for exhaust air expelled via the second air tract to give off, as required and via the heat exchanger of the ventilation device, at least part of the thermal energy contained therein to the first air tract, and simultaneously the undesired gases diluted by the air volume flow can be expelled together with the air volume flow via the external air connection.

The domestic power plant pursuant to the invention has the advantage that the fuel cell unit it comprises, the storage battery unit and/or the domestic power plant themselves do not necessarily have to be designed to be technically completely leak-tight. Instead, the formation of explosive gas mixtures in the domestic power plant is avoided due to the ability to expel undesired gases diluted by the air volume flow together with the air volume flow via the external air connection. Thus, the domestic power plant pursuant to the invention can, on the one hand, be operated safely and, on the other, be manufactured in a cost-efficient manner.

Undesired gas released in the fuel cell unit may, for example, be leakage gas containing hydrogen. Undesired gas released in the storage batter unit may, for example, be hydrogen sulfide (lead accumulator) or, in case of corresponding temperatures, diethyl carbonate (lithium ion accumulator).

Due to the fact that expelled exhaust air can give off at least part of the thermal energy contained therein, i.e, for example the waste heat of the fuel cell unit and the storage battery unit, to the first air tract via the heat exchanger of the ventilation device, the domestic power plant has an energetically advantageous design. A comparably low electrical efficiency of the fuel cell unit can be compensated through the use of waste heat.

The invention also incorporates the finding that domestic energy plants with hydrogen as an energy carrier must fulfill stricter safety requirements, since in a large range of mixing ratios, hydrogen and oxygen or air, respectively, form explosive mixtures. The invention also incorporates the finding that, especially in private homes, the use of explosion protected components would hardly be able to be economically justified. The domestic power plant pursuant to the invention, however, provides an alternative safety concept, which is based on the fact that any hydrogen that might potentially leak from an electrolysis unit and/or a fuel cell unit and/or from another component can be diluted by means of a dilution with the exhaust air of the domestic energy plant until it is clearly below its flammability limit. The safety relevant function of the presence of a sufficiently large cooling and flushing volume flow for the dilution of potentially leaking gases containing H2 and/or of gases containing H2 intentionally released during operation is preferably monitored via a suitable sensor system, preferably via a flow monitor and/or a differential pressure gauge and/or via an explosion protected H2 sensor.

Guided by the exhaust air tract, the cooling and flushing volume flow is able to flow through the housing of the domestic energy plant with all the subspaces arranged therein. The exhaust air tract may be designed such that it is able to absorb the occurring waste heat of the components and, at the same time, also absorbs any potentially leaking hydrogen, diluting it to total concentrations of clearly below the flammability limit (the LFL is 4% H2 in air), transporting it away and releasing it as exhaust air into the surrounding environment.

The storage battery unit is preferably arranged within the housing of the domestic energy plant, preferably within its own subspace. The storage battery unit may be arranged outside the housing of the domestic energy plant. In that case, sections of the exhaust air tract run outside the housing of the domestic energy plant. In a particularly preferred embodiment, the domestic energy plant comprises a separate, also sufficiently airtight housing for the storage battery unit, which has a feed duct and a discharge duct for the cooling and flushing volume flow, via which the cooling and volume flow may be guided in and out. Especially in the case of lead batteries, efficient cooling ensuring a homogeneous temperature distribution with temperature deviations of <5 K, preferably <3 K, and simultaneously allowing for an average temperature of preferably <25° C. is advantageous for achieving a longer service life. In a particularly advantageous embodiment, the cooling and flushing volume flow is first of all guided into an air distribution volume with little pressure loss, subsequently flows around the individual battery cells or battery cell blocks in defined columns with defined pressure losses which are significantly higher than those in the distributors and collection volumes, and is collected in a collection volume with little pressure loss, from where it is expelled. The advantage of this arrangement is a very homogenous distribution and propagation of the cooling and flushing volume flow around the battery cells and thus a particularly efficient and homogenous cooling of the individual cells. Any undesired gases leaking from the storage battery, in particular gases containing H2 which might occur if the storage battery unit is overcharged, can be removed via the exhaust air.

The components of the domestic energy plant can be arranged within one housing or several housings connected to each other via the exhaust air tract, which, from a technical point of view, are sufficiently airtight against the surrounding environment. Sufficiently leak-tight from a technical point of view shall mean in the present context that the loss of an air volume flow across the housing boundaries is smaller than 20%, preferably smaller than 5%, than the entire cooling and flushing volume flow.

With regard to hydrogen safety, technically permanently leak-tight components and connection elements are used wherever possible. Components which, due to their design and function, cannot be realized in a permanently technically leak-tight manner are collected in separate subspaces and ignition sources are avoided and/or explosion protected components are used. Recurrent leak tests, preferably during operation, ensure a sufficient leak-tightness of the component with regard to H2 leaks.

In a preferred embodiment, the domestic power plant is provided with a feed air connection and an exhaust air connection for connecting the domestic power plant to at least one living space to be centrally ventilated such that an airflow flowing into the feed air tract of the domestic power plant can first of all be fed into the living space as feed air and that exhaust air from the living space can be propagated in the exhaust air tract of the domestic power plant. Preferably, heat-recovery ventilation (KWL) can thus be performed by means of the domestic power plant, wherein heat expelled from the domestic power plant can be used for heating the living space. In addition to the ventilation device, further components typical of a KWL, such as filters, heat exchangers, flaps, may be centrally integrated into the domestic power plant or be realized such that they can be connected in a modular manner to the housing of the domestic power plant. Especially in connection with a KWL it has turned out to be advantageous if the fuel cell unit is air-cooled, preferably exclusively air-cooled. Preferably, the fuel cell unit of the fuel cell unit has proton exchange membranes so that the fuel cell unit is a PEM fuel cell unit.

In order to also be able to cool the feed air to be fed into the living space in the summer, a cooling unit may be arranged downstream of the first air tract of the ventilation device. Said cooling unit may, for example, comprise a second heat exchanger and a chiller connected to this heat exchanger. The chiller is preferably a compression chiller.

The feed air tract may be directly connected to the exhaust air tract. This lends itself for example to existing buildings where heat-recovery ventilation cannot be realized—for example due to the costs. In this alternative embodiment, the use of the waste heat of the domestic power plant can, in particular (but not exclusively), take place via a heat pump and/or gas-liquid heat exchanger thermally coupled to the exhaust air tract, preferably with the goal of injecting the thermal energy of the exhaust air tract into the hot water (WW) circuit of a house. The fuel cell unit may be liquid-cooled and be, at least intermittently, thermally coupled to a hot water storage unit of the domestic power plant.

The housing of the domestic power plant may have several separate subspaces coupled to each other via the exhaust air tract. Preferably, the individual subspaces are arranged in the housing of the domestic power plant in the order of increasing amounts of potentially emitted H2. Pursuant to a second priority, which is subordinate to the safety-related priority, the individual subspaces are preferably arranged in accordance with the requirement of the operating temperature and/or the cooling and/or in dependence on process-related aspects. In this context, assemblies with similar safety characteristics may also be combined into shared subspaces or subspace groups and also be arranged within these subspace groups differently with regard to the flow order, in accordance with thermal and/or process-related requirements. This includes that subspaces, which are flown through one after the other, may also be created within subspace groups.

The use of a storage batter unit comprising lead batteries as a short-term storage unit, for example, requires comparably low temperatures, preferably in the range from 20-25° C. This means that the lead battery should be arranged as close as possible to the input of the ventilation system for the cooling and flushing volume flow, in other words, as far as possible upstream in the exhaust air tract. Since, however, during the charging process, small amounts of H2 may be created, the storage battery unit is preferably arranged downstream of power electronics, which do not emit hydrogen, but generate waste heat.

Likewise preferably, the domestic power plant is provided with an electrolysis unit which is arranged within the housing and integrated into the exhaust air tract such that undesired gas released in the electrolysis unit can be diluted by the air volume flow and be removed together with waste heat of the electrolysis unit.

By means of the provided electrolysis unit, a surplus electric power, e. g. of a photovoltaic installation, can preferably be converted into hydrogen to be stored. The electrolysis unit has its own electrolyte/cooling circuit and can release the heat generated in the electrochemical process via suitable heat exchangers to the cooling and flushing volume flow and/or to a hot water storage unit. The waste heat exiting via the component surfaces is also transferred into the cooling and flushing volume flow. Thus, the waste heat of the electrolysis unit can be used almost completely for the provision of thermal energy to the household.

The domestic power plant may be designed such that the airflow exiting the fuel cell unit, which may be fed as exhaust air into the second air tract of the ventilation device, is guided in such a way that it will only mix with the exhaust air from a respective living space after the latter has flown through the electrolysis unit.

In order to be able to further improve the energy efficiency of the domestic power plant, power electronics comprised by the domestic power plant, such as a solar regulator, an island inverter and/or a DC/DC converter, may be integrated into the exhaust air tract. The cooling and flushing volume flow of the domestic power plant may circulate around the power electronics such that an effective cooling is realized through forced convection via the cooling and flushing volume flow. Optionally, further power electronics components and/or electrical components and/or sensors may be integrated. This has the advantage that, contrary to the usual way of installation of some power electronics components, which is often based on natural, passive convection cooling, an active circulation and, thus, a more efficient convective cooling through the cooling and flushing volume flow allows for a significantly more compact design of the installation space.

It is particularly preferred that the domestic power plant has a mixing region, which is, at least intermittently, fluidly connected to the fuel cell unit such that the mixing region is able to absorb a flushing gas exiting the fuel cell unit. It is furthermore preferred that the mixing region is connected to the ventilation device such that an airflow exiting the mixing region can, together with the flushing gas, be fed into the second air tract of the ventilation device as exhaust air.

The fuel cell unit may include an air-cooled fuel cell stack with an open cathode, where preferably the cooling air for the cathode and the reaction air are one and the same volume flow, via which preferably the process water generated during the reaction in the fuel cell unit, as well, is expelled in the form of air humidity. This air humidity can be used to complement external air heated by the ventilation device with humid output air in such a way that the feed air to be fed into the living space has a desired air temperature and/or desired air humidity. It has proven to be advantageous in this context that the fuel cell unit is connected to the ventilation device such that an airflow flowing into the feed air tract of the domestic power plant can also first of all be fed as indirect feed air into the fuel cell unit and, via the latter, if need be, indirectly into the respective living space. Thus, the air of the living space can be humidified in a comfortable manner with clean process water of the fuel cell unit. A ratio between direct and indirect feed air may be adjustable. A ratio between the feed air portion and the exhaust air portion of the airflow exiting the fuel cell unit may be adjustable.

The fuel cell unit may be connected to the ventilation device and a respective living space such that an airflow exiting the fuel cell unit can, on the other hand, be fed as exhaust air into the second air tract of the ventilation device together with the exhaust air from the respective living space. Thus, process water of the fuel cell unit can be guided past the living space, if, for example, the latter's space air is already sufficiently humidified.

Preferably, the domestic power plant has a flow monitor and/or an explosion protected H2 sensor in the exhaust air tract. Alternatively or in addition, the domestic power plant may be designed to [guide] a volume flow via at least one measurement point, for example at the input of flow-through areas where H2 might be released.

In a preferred embodiment, the domestic power plant has a catalytic combustor/recombiner, which, with regard to its position in the cooling and flushing volume flow, is arranged downstream of the electrolysis unit and which is integrated into the cooling and flushing volume flow of the domestic power plant such that the cooling and flushing volume flow is or is able to be guided via the catalytic combustor. Preferably, the combustion heat of the catalytic combustor is coupled into the hot water storage unit via a heat exchanger and a water circuit. The components of the catalytic combustor may preferably be cooled externally via the cooling and flushing volume flow and the warm exhaust gases may optionally also be released into the cooling and flushing volume flow, in a particularly preferred embodiment via the downstream mixing region.

In a particularly preferred arrangement, first of all the ventilator and, if applicable, additional ventilation installations are arranged in the course of the cooling and flushing volume flow, followed by, downstream of them, the spaces for electrical equipment and/or power electronics and/or the sensor system and/or an ultra-short-term storage module (supercap) and/or permanently technically leak-tight components. Since, up to this point in the air duct no H2 emissions have to be expected in the system, the flow up to this point may be either parallel or serial. Then, the flow in the particularly preferred arrangement goes through the space with the short-term energy storage unit which is preferably designed as a battery storage unit. What follows next downstream preferably flown through serially is the at least one space for the electrolysis unit and/or for the fuel cell unit and/or for the catalytic combustor and/or for the catalytic recombiner. Further downstream, the one or several spaces for the mixing of gases containing H2 into the flushing airflow follow, which, in a particularly preferred embodiment, are separate from the spaces of the above described components. Preferably, the purge gases of the fuel cell unit and/or electrolysis and/or the waste gases of the catalytic combustor and/or the catalytic recombiner and/or the cathode waste air of a liquid-cooled fuel cell unit can be guided into these mixing regions and be mixed with the cooling and flushing volume flow. In a particularly preferred arrangement, the mixing region and the mix-in points therein are designed in an optimized manner with regard to improved mixing.

In another preferred embodiment, the domestic power plant has a purge device for flushing the fuel cell unit on its anode side and/or the electrolysis unit on its cathode side. The purge device may be integrated into the cooling and flushing volume flow such that a purge gas potentially rich in H2 exiting the purge device is mixed into the cooling and flushing volume flow and removed from the domestic power plant as output air. In a particularly preferred embodiment, the purge device comprises an expandable buffer container, preferably a bellows storage unit, which releases the very high purge volume flows, which however, in the way of a pulse, only last approx. 0.5 s, at a low pressure in an intermediately buffered and delayed manner, preferably within approx. 20 s, with a significantly lower volume flow into the mixing point. This has the advantage that the flushing volume flow which is required for always keeping a concentration of the generated mixture below the lower flammability limit can have significantly smaller dimensions and/or that the requirement for the mixing point with regard to the mixing quality and/or for the structural and procedural design of a downstream catalytic recombiner can be significantly reduced. The individual assemblies of the purge device may be distributed over the different above mentioned areas of the domestic power plant, in accordance with their potential to release hydrogen.

With regard to the method for operating a domestic power plant, the object is achieved by means of a method for operation a domestic power plant, in particular an above-described domestic power plant, comprising the following steps:

guiding external air in a first air tract via a heat exchanger, or via an external air bypass, past a heat exchanger, into a feed air tract of the domestic power plant, propagating an air volume flow brought about by the ventilation device in an exhaust air tract of the domestic power plant, which runs, at least partially, within a housing of the domestic power plant, diluting undesired gas released in the fuel cell unit by means of the air volume flow and removing the diluted gas together with waste heat from the fuel cell unit, diluting undesired gas released in the storage battery unit by means of the air volume flow and removing the diluted gas together with waste heat from the storage battery unit, guiding exhaust air via a second air tract which is connected to the exhaust air tract, wherein the second air tract of the ventilation device is thermally coupled to the first air tract via the heat exchanger of the ventilation device such that it is possible for exhaust air expelled via the second air tract to give off, via the heat exchanger of the ventilation device, at least part of the thermal energy contained therein to the first air tract, and simultaneously the undesired gases diluted by the air volume flow can be expelled together with the air volume How via the external air connection, so that the formation of explosive gas mixtures in the domestic power plant is avoided and the domestic power plant can be operated safely.

The method may comprise the following step, preferably if the domestic power plant is operated in connection with heat-recovery ventilation:

feeding external air from outside a living space as direct feed air into a living space or, as indirect feed air, first via a gas-gas heat exchanger, which transfers heat and, if need be, humidity from the outgoing air into the feed air, and/or via a fuel cell unit and then into the living space, and/or guiding exhaust air from the living space as a cooling and flushing volume flow for flushing and heat absorption via the components of the domestic power plant and, optionally, via an air-air heat exchanger for transferring heat and, if need be, humidity, into the feed air, in particular, prior to a removal of said exhaust air as output air from the domestic power plant.

The method may comprise the following step, preferably if the domestic power plant is not operated in connection with heat-recovery ventilation:

feeding external air from outside a living space as direct feed air into the domestic power plant, first of all via a gas-gas heat exchanger for preheating or, optionally, in case of high outside temperatures, in a bypass past said gas-gas heat exchanger, and using said external air as a cooling and flushing volume flow for diluting and removing flammable gases as well as for the absorption of heat via the components of the domestic power plant.

Preferably, the method pursuant to the invention comprises the following step:

decoupling heat into a hot water storage unit via an air-water heat exchanger and/or an air-water heat exchanger of a heat pump; and/or preheating the feed air via an air-air heat exchanger and removing the cooling and flushing volume flow as outgoing air form the domestic power plant.

The method may be further developed by means of the features described with regard to the domestic power plant.

BRIEF DESCRIPTION OF THE DRAWINGS

In the following, exemplary embodiments of the present invention are explained by way of example with references to the attached figures. The following is shown in FIG. 1 a schematic illustration of a domestic power plant connected to a living space to be ventilated and comprising an exclusively air-cooled fuel cell unit, FIG. 2 a schematic illustration of a domestic power plant connected to a living space to be ventilated and comprising a liquid-cooled fuel cell unit, FIG. 3 a schematic illustration of a domestic power plant without ventilation connection to a living space and comprising an exclusively air-cooled fuel cell unit, FIG. 4 a schematic illustration of a domestic power plant without ventilation connection to a living space and comprising a liquid-cooled fuel cell unit, and FIG. 5 a schematic illustration of a preferred exemplary embodiment of a domestic power plant pursuant to the invention with a ventilation connection to a living space.

DETAILED DESCRIPTION

Figure 1:
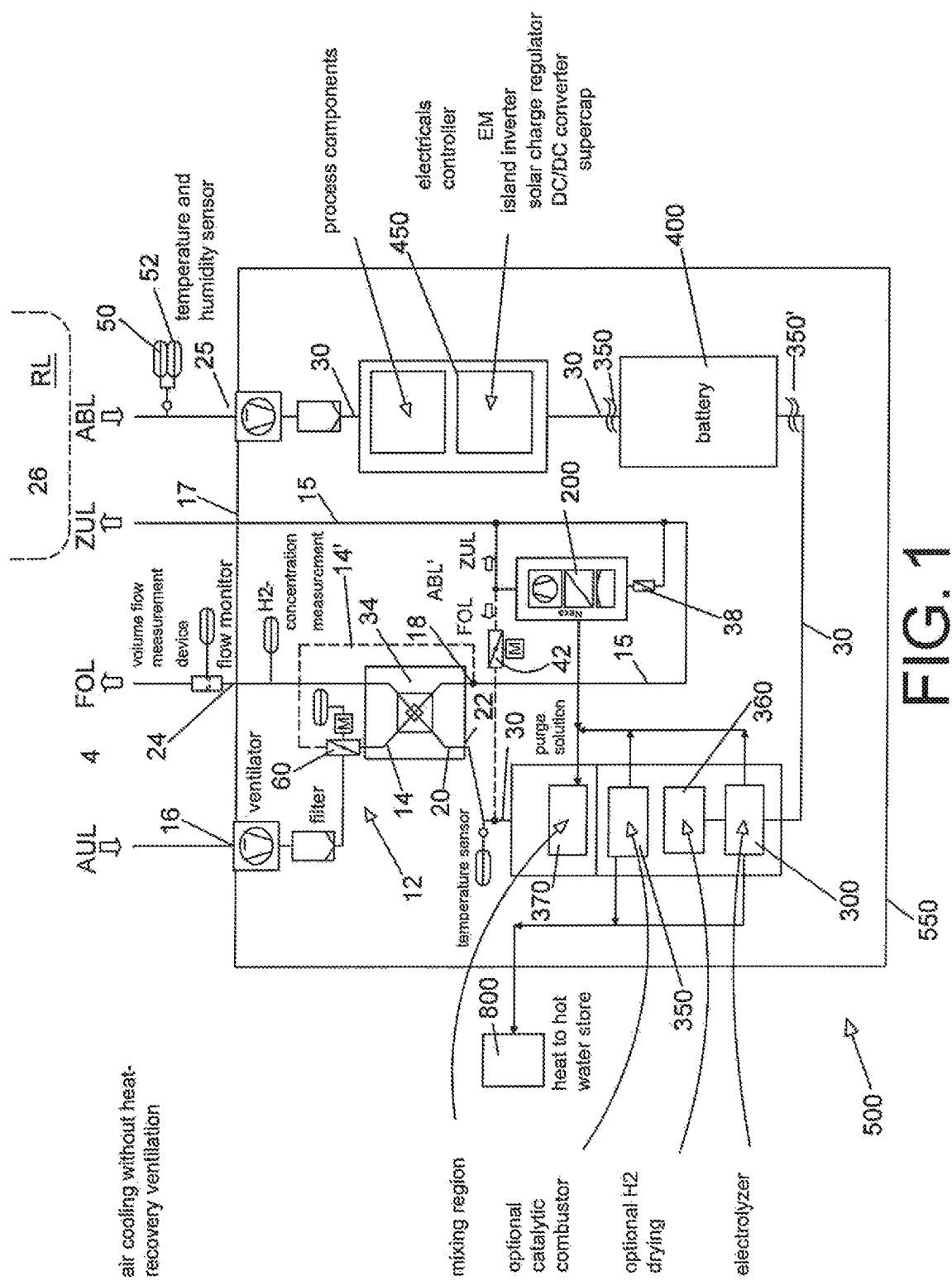

A domestic power plant 500 shown in FIG. 1 comprises a ventilation device 12 which comprises a first air tract 14 from an external air connection 16 to a feed air connection 18 as well as a second air tract 20 from an exhaust air connection 22 to an output air connection 24. Among these connections, it is the external air connection 16 and the output air connection 24 that are connected to the surrounding environment U of a living space 26 during operation, and not the living space 26, itself. The feed air connection 18 is connected to the living space 26 both directly via a feed air tract 15 and indirectly via a fuel cell unit 200. The exhaust air connection 22 is connected to the living space 26 via an exhaust air tract 30.

In addition, the domestic power plant 500 comprises an electrolysis unit 300 which is integrated into the exhaust air tract 30 of the domestic power plant 500 such that the exhaust air ABL from the living space 26 is guided as a cooling and flushing volume flow via the electrolysis unit 300 before it can flow to the second air tract 20 of the ventilation device 12.

Optionally, a hydrogen dryer 360 and/or a catalytic combustor 350 are arranged downstream of the electrolysis unit 300. The optional catalytic combustor 350 serves the catalytic combustion of hydrogen from a hydrogen tank (not shown) and thus the provision of thermal energy for the provision of hot water and heating energy. The catalytic combustor 350 is integrated into the exhaust air tract 30 of the domestic power plant 500 such that the process air required for the H2 combustion is taken from the cooling and flushing volume flow, that the exhaust air ABL from the living space 26 is guided as a cooling and flushing volume flow via the catalytic combustor 350 and that, after the combustion, the process air is guided back into the cooling and flushing volume flow, preferably in the mixing region 370. A mixing region 370, in which a purge gas containing hydrogen, which comes from the fuel cell unit 200 and/or the electrolysis unit 300, can be mixed into the cooling and flushing volume flow and be removed from the domestic power plant in the exhaust air tract 30 as output air FOL, is arranged downstream of the catalytic combustor 350 in the exhaust air tract 30. A purge gas may, for example, be obtained by means of a purge device (not shown) for flushing the fuel cell unit 200 on its anode side and the electrolysis unit 300 on its cathode side.

In the bottom area of the domestic power plant 500, FIG. 1 shows a storage battery exhaust air connection 350, via which a storage battery 400, which is assigned to the domestic power plant 500 and, in that example, included, is integrated into the exhaust air tract 30 of domestic power plant 500. Thus, the exhaust air ABL from the living space 26 is also guided via the storage battery 400. Thus, in addition to the waste heat of the storage battery 400, undesired gas releases of the storage battery 400, in particular also H2, which is generated when the storage battery unit is overcharged, can also be expelled.

As can also be seen in FIG. 1, the domestic power plant 500 has power electronics components 450, which are also integrated into the exhaust air tract 30 of the domestic power plant 500. Thus, the exhaust air ABL from the living space 26 is also guided via the power electronics components 450. Via the power electronics components 450, the storage battery 400 can, for example, be charged by means of solar electricity of a photovoltaic installation (not shown), the household can be supplied with 230 VAC and/or the fuel cell unit and/or the electrolysis unit can be coupled to the 48 VDC node, to which the storage battery unit 400 is connected as well. Optionally and not shown by this illustration, an ultra-short-term storage unit (supercap), which is also connected to the 48 VDC node, may also be integrated at this point.

In the present example, the ventilation device 12, the fuel cell unit 200, the electrolysis unit 300, the power electronics components solar charge regulator 450, the storage battery unit 400, the catalytic combustor 350 and the hydrogen dryer 360 are arranged in a shared housing 550, which makes the domestic power plant 500 particularly compact.

Both the first ventilation tract 14 of the ventilation device 12 and the second ventilation tract 20 of the ventilation device 12 are guided via a heat exchanger 34 of the ventilation device 12 so that a heat exchange takes place between the airflows guided via the two air tracts 14 and 20. In winter, exhaust air ABL guided via the second air tract 20, for example, can transfer its heat to the exterior air AUL guided via the first air tract 14 so that at least a part of the heat energy of the room air RL which otherwise would have been expelled with the output air FOL can be recovered and be fed back into the living space 26.

Furthermore, an exterior air bypass 14' with a bypass flap 60 is provided at the ventilation device 12, in order to bypass, if need be, the heat exchanger 34 of the ventilation device 12. This bypass flap 60 can be controlled such that exterior air AUL flowing in via the exterior air connection 16 flows directly into the feed air tract 15.

On the input side, the fuel cell unit 200 is connected to the feed air connection 18 of the ventilation device 12 via a part of the feed air tract 15 and is thus supplied with fresh and optionally preheated feed air ZUL, which is simultaneously required both for the reaction with the hydrogen in the fuel cell unit of the fuel cell unit 200 and as cooling air for expelling the heat generated during the reaction. The fuel cell unit of the fuel cell unit 200 has proton exchange membranes (PEM membranes) to which the reaction airflow and the cooling airflow are not fed separately, but in one airflow. Said airflow through the fuel cell unit 200 absorbs water generated as a result of the reaction in the fuel cell unit and is thus humidified. The warm and humid airflow exiting the fuel cell unit 200 is respectively fed either in its entirety or partially to the feed air tract 200 and/or the exhaust air tract 30.

If the feed air ZUL existing the ventilation device 12 is cooler and dryer than the desired room air RL, i.e. if heat and humidity must be added to it, a part of or the entirety of the air exiting the fuel cell unit 200 will be fed into this feed air ZUL. To this end, the output of the fuel cell unit 200 is connected to the feed air tract 15 via a first fuel cell output tract 36. On the input side, a non-return flap 38 is arranged upstream of the fuel cell unit 200.

If, however, the feed air ZUL 18 exiting the ventilation device 14 is already sufficiently hot or humid, the air exiting the fuel cell unit 200 will be guided via a second fuel cell exit tract 40 and, via a ventilation flap 42 arranged therein, fed into the exhaust air tract 30 as exhaust air ABL' and thus be guided back to the ventilation device 12.

This has the advantage that the reaction heat expelled with the air exiting the fuel cell unit 200 is guided by means of the exhaust air flow through the heat exchanger 34 of the ventilation device 12 so that this heat energy as well can, at least partially, be reclaimed from the exhaust air flow and be fed into the feed air flow.

In this example, the air flow exiting the fuel cell unit 200, which may be fed as exhaust air ABL' into the second air tract 20 of the ventilation device 12, is guided in such a way that it will only mix with the exhaust air ABL from a respective living space 26 after the latter has flown through the electrolysis unit 300.

Due to the non-return flap 38, it can also be adjusted via the controllable ventilation flap 42 how much of the feed air ZUL exiting the ventilation device 12 is fed directly into the living space 26 and how much of said air is guided to the fuel cell unit 200 and thus, if applicable, fed indirectly into the room air RL in the living space 26.

In the heat-controlled mode of operation described above, the controlling of the domestic power plant 500 and of the ventilation flap 42, in particular, is based on the air temperature and air humidity in the living space 26. An air humidity sensor 50 and an air temperature sensor 52 are arranged at the exhaust air connection 25 for control purposes.

Figure 2:
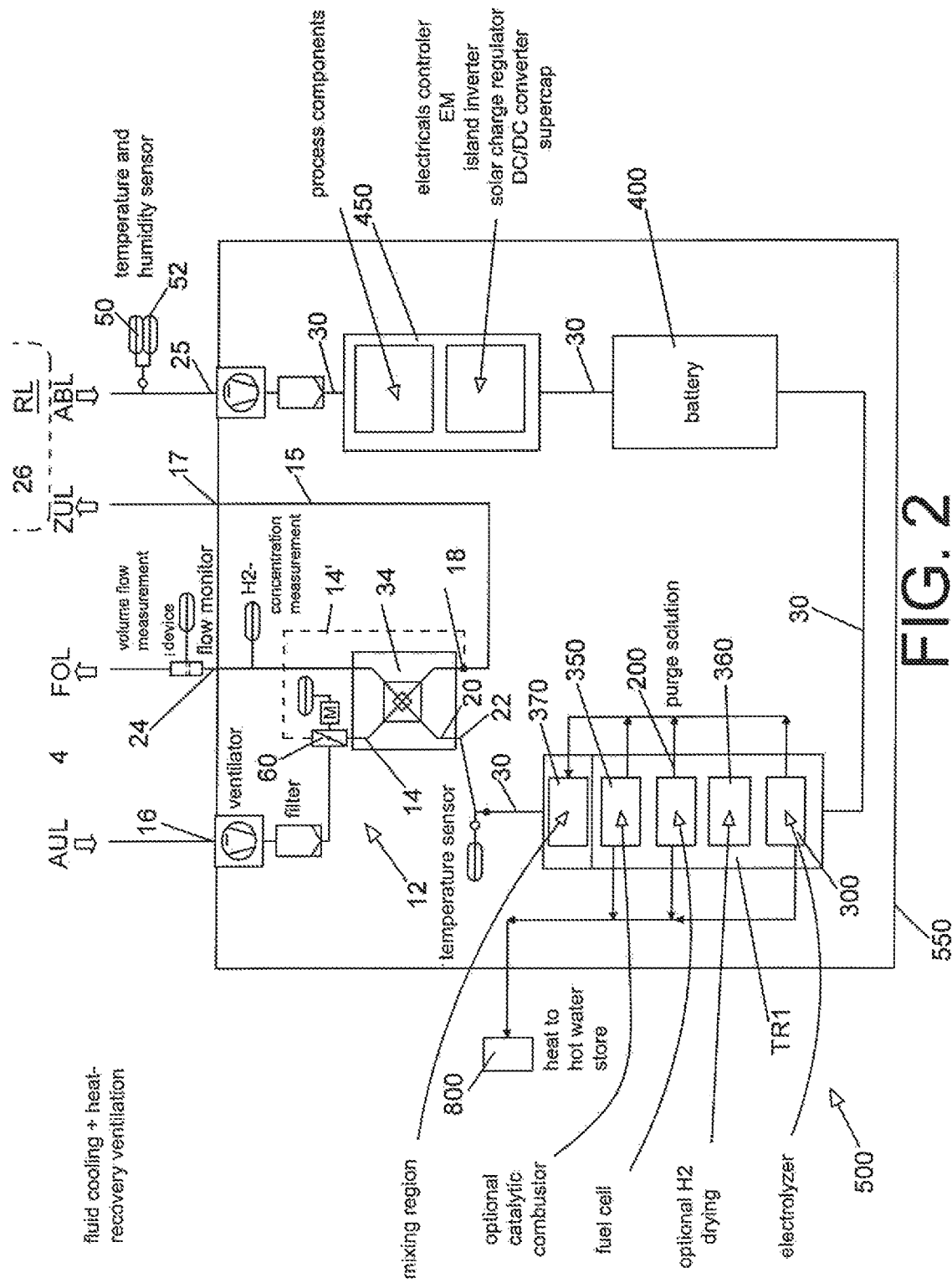

The embodiment of the domestic power plant 500 in FIG. 2 shows the integration of a liquid-cooled fuel cell unit 200. In this case, the main heat of the fuel cell unit 200 is released into a hot water storage unit 800 via a cooling circuit. The fuel cell unit 200 may be integrated into the same subspace TR1 into which the electrolysis unit 300 is integrated as well. Instead of using the devices for the optional direct coupling of the fuel cell cooling air into the feed air of the living spaces, this embodiment uses a part of the cooling and flushing volume flow as fuel cell reaction air in the fuel cell cathode and subsequently mixes the humid and heated exhaust air from the fuel cell cathode with the cooling and flushing volume flow. Heat and humidity from the fuel cell unit 200 can thus be released into the feed air ZUL via the cooling and flushing volume flow and via the gas/gas heat exchanger 12.

Figure 3:
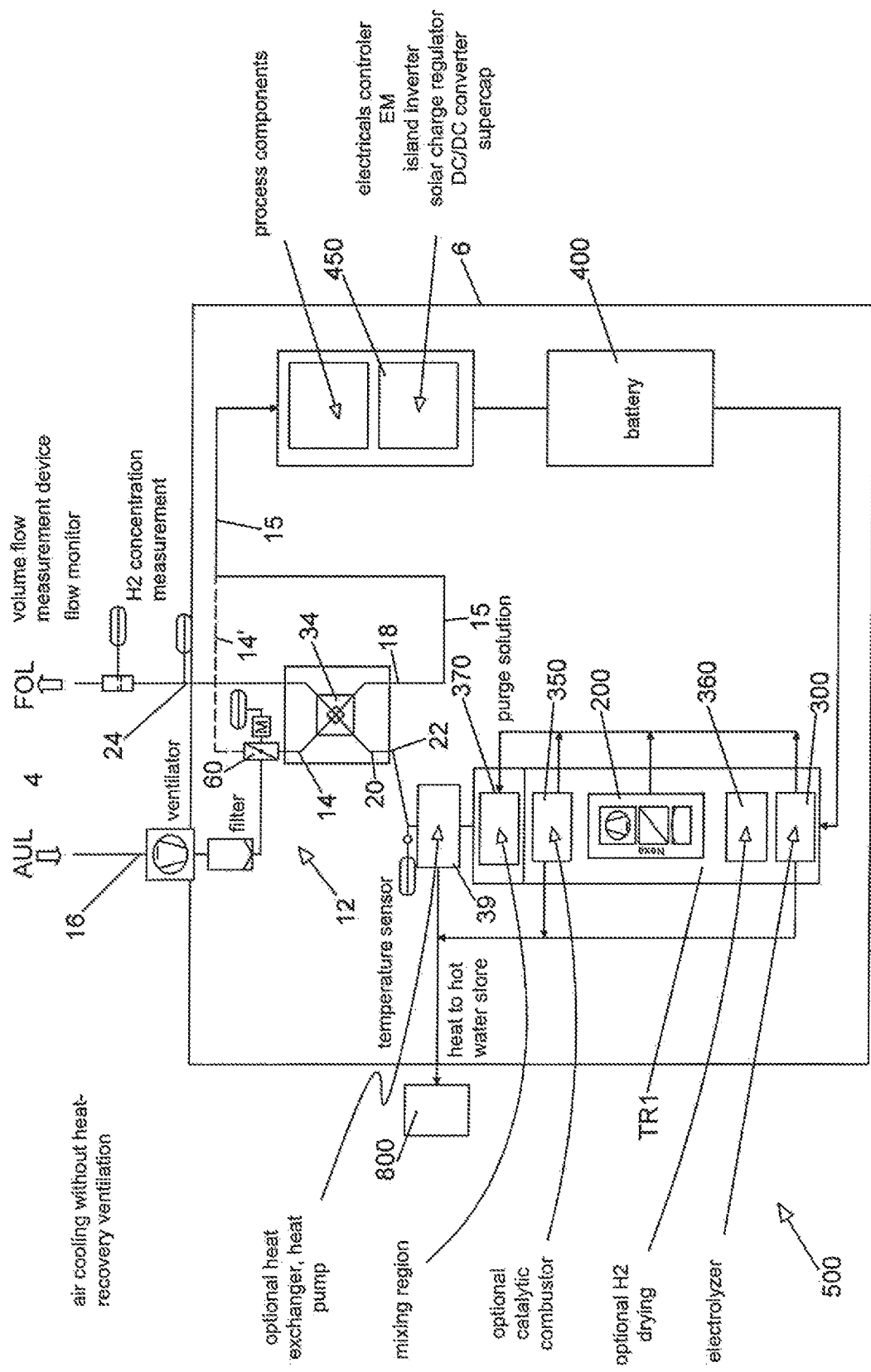

FIG. 3 shows an exemplary embodiment of the domestic power plant 500 without connection to heat-recovery ventilation, which is common in case of an integration into existing residential buildings, since heat-recovery ventilation systems installed in such buildings are often not to be upgraded. In this example, the domestic power plant 500 obtains exterior air AUL via a blower and a filter as part of the ventilation device 12 and optionally heats up this exterior air AUL via a gas/gas heat exchanger 34 and thus provides the cooling and flushing volume flow for the domestic power plant 500. This cooling and flushing volume flow and, therefore, the ventilation components within the housing, especially also the ventilator, the flow channels and the gas/gas heat exchanger 34, may be realized with significantly smaller dimensions than in the exemplary embodiments of FIG. 1 and FIG. 2, where preferably the entire exhaust air ABL of the living space 26 is used, and can be dimensioned solely depend on the requirements of the safety/heat and process technology of the domestic power plant 500. Another advantage of this embodiment is the more compact design when only one volume flow is present in and guided through the housing 550.

The air-cooled fuel cell unit 200 withdraws at least a partial amount from the cooling and flushing volume flow for the electrochemical reaction with the hydrogen and for the cooling of the fuel cell unit 200. This airflow through the fuel cell unit 200 absorbs water and heat generated as a consequence of the reaction in the fuel cell unit 200 and is thus humidified. The hot and humid airflow exiting the fuel cell unit 200 is mixed with the non-used portion of the cooling and flushing volume flow and flows through the further parts of the plant in order to dilute exiting gases and to absorb heat. The heat released into the cooling and flushing volume flow by all the components within the housing may be released into the hot water storage unit 800 via the optional heat exchanger 39, which may be coupled to the hot water storage unit 800 directly or via a heat pump.

Figure 4:
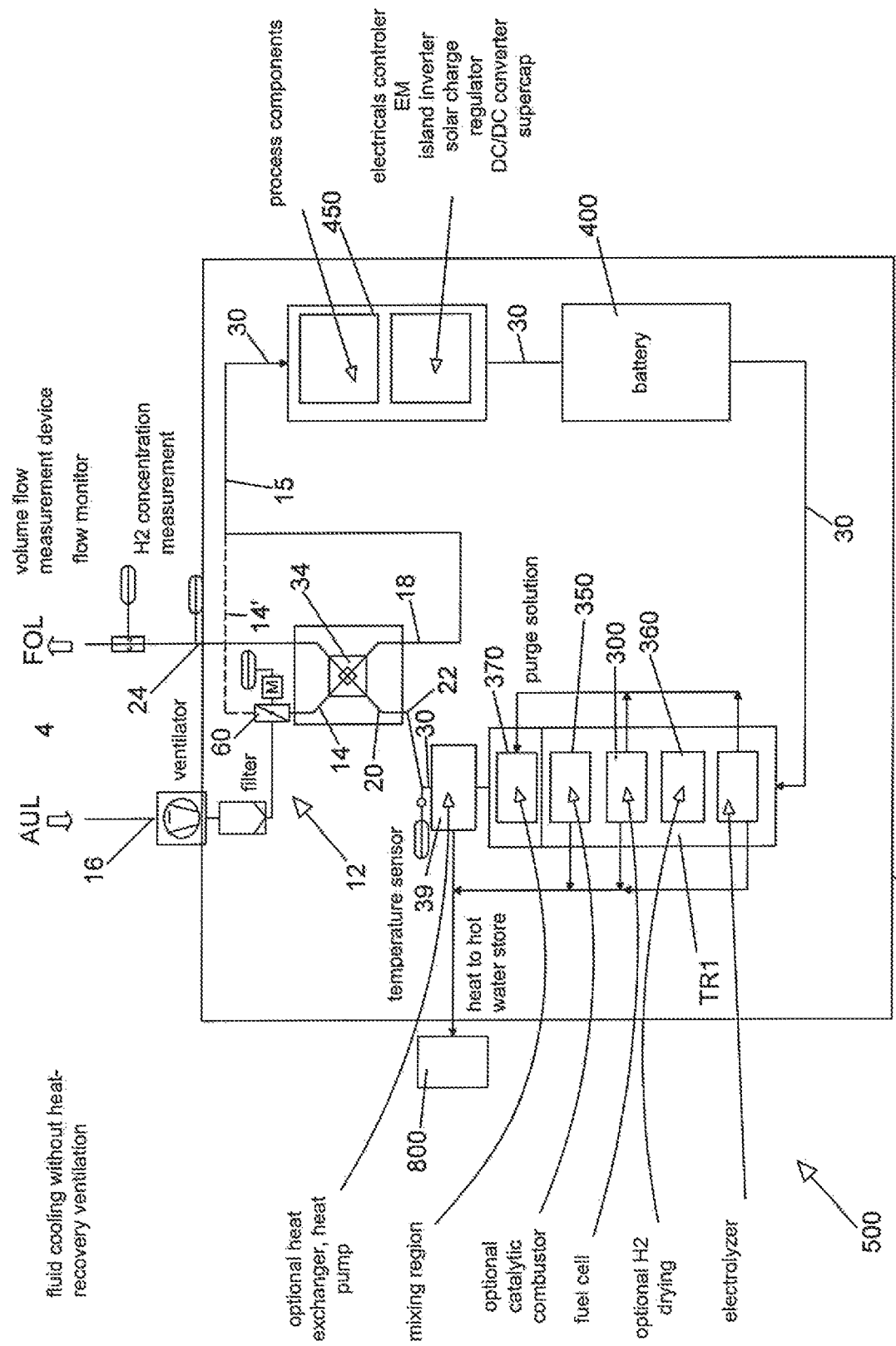

FIG. 4 shows an exemplary embodiment of the domestic power plant 500, similar to FIG. 3, where there is no connection to heat-recovery ventilation and where a liquid-cooled fuel cell unit 200 is integrated. In this exemplary embodiment, the main heat of the fuel cell unit 200 is released into the hot water storage unit (not shown) via a cooling circuit. The fuel cell unit 200 may be integrated into the same subspace TR1 into which the electrolysis unit 300 is integrated as well. A small portion of the cooling and flushing volume flow is guided into the fuel cell cathode as fuel cell reaction air and the humid and heated cathode exhaust air is mixed with the cooling and flushing volume flow. In this case, as well, the heat released into the cooling and flushing volume flow by all the components within the housing 550 may be released into the hot water storage unit 800 via the optional heat exchanger, which may be coupled to the hot water storage unit 800 directly or via a heat pump.

Figure 5:
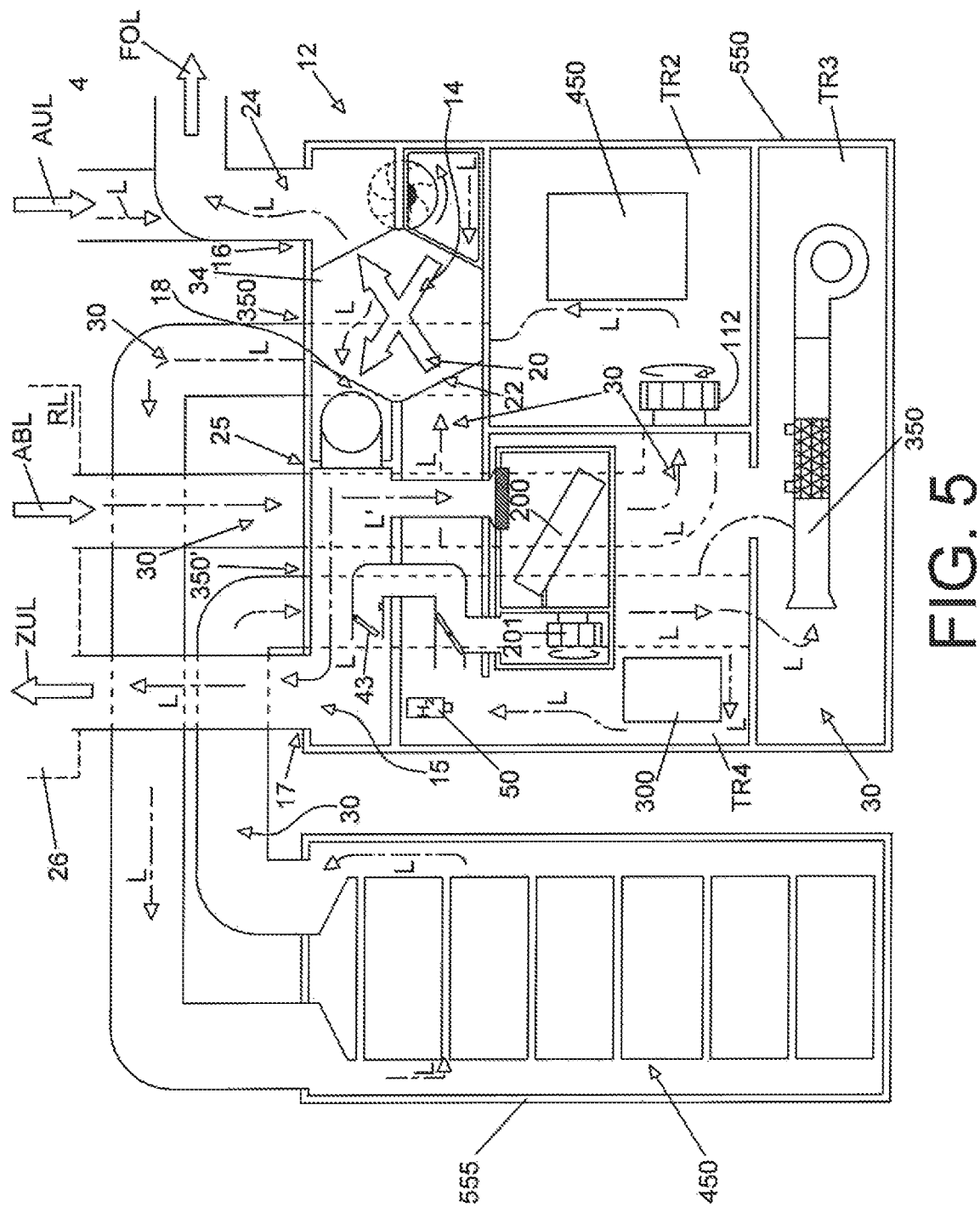

A domestic power plant 500 in FIG. 5 serves the self-sufficient energy provision of a residential building equipped with heat-recovery ventilation with electricity and/or heat. The domestic power plant 500 in FIG. 5 comprises a housing 550 which comprises an external air connection 16 and an output air connection 24. Furthermore, a ventilation device 12 is provided, which comprises a heat exchanger 34. The ventilation device 12 is connected to the external air connection 16 such that external air AUL can flow in a first air tract 14 via the heat exchanger 34 into a feed air tract 15 of the domestic power plant 500. The feed air tract 15 runs at least partially within the housing 550.

The domestic power plant 500 comprises a feed air connection 17 and an exhaust air connection 25 for connecting the domestic power plant 500 to at least one living space 26 to be centrally ventilated in such a way that an airflow flowing into the feed air tract 15 of the domestic power plant 500 can first of all be fed into the living space 26 as feed air ZUL. The domestic power plant 500 in FIG. 5 also comprises an exhaust air tract 30, in which an air volume flow brought about by the ventilation device 12 can be propagated within the housing 550. Exhaust air ABL from the living space 26 is propagated in the exhaust air tract 30 of the domestic power plant 500.

Furthermore, the domestic power plant 500 in FIG. 5 comprises a fuel cell unit 200, which is arranged within the housing 550 and integrated into the exhaust air tract 30 such that undesired gas released in the fuel cell unit 200 can be diluted by the air volume flow and be removed together with waste heat from the fuel cell unit 200. A storage battery unit 450, which is arranged in an external housing 555 and integrated into the exhaust air tract 30 such that undesired gas released in the storage battery unit 450 can be diluted by the air volume flow and be removed together with waste heat from the storage battery unit 450, is also a part of the domestic power plant 500.

The domestic power plant 500 in FIG. 5 is equipped with a second air tract 20 which is connected to the exhaust air tract 30, wherein the second air tract 20 of the ventilation device 12 is thermally coupled to the first air tract 14 via the heat exchanger 34 of the ventilation device 12 such that it is possible for exhaust air ABL expelled via the second air tract 20 to give off, via the heat exchanger 34 of the ventilation device 12, at least part of the thermal energy contained therein to the first air tract 14, and simultaneously the undesired gases diluted by the air volume flow can be expelled together with the air volume flow via the external air connection 16, so that the formation of explosive gas mixtures in the domestic power plant is avoided and the domestic power plant can be operated safely.

In the following, the course of an air volume flow L (dashed line), which, in the context of this application, is also referred to as cooling and flushing volume flow, through the domestic power plant 500 is explained with reference to FIG. 5. Similar to the exemplary embodiment of FIG. 1, FIG. 5 shows a domestic power plant 500 which comprises an exclusively air-cooled fuel cell unit 200 and is connected to a living space 26 for the purpose of heat-recovery ventilation.

First of all, exterior air AUL from the surrounding environment U enters the domestic power plant as an air volume flow L via the exterior air connection 16 of the housing 550. This is achieved by means of a blower of the ventilation device 12. In the further course, the air volume flow L flows via the first air tract 14, via the heat exchanger 34 into the feed air tract 15 and from there via the feed air connection 17 into the living space 26. A portion L' of the air volume flow L is fed in a parallel flow into the fuel cell unit 200 (in FIG. 5, by way of example downwards). This portion L' is suctioned in by a blower 201 of the fuel cell unit 200. After flowing past the fuel cell unit 200, the portion L' mixes (as indirect feed air) via the slightly opened control flap 43 with the air volume flow L, which, from there, flows via the feed air connection 17 into the living space 26.

In the further course, the air volume flow L flows (as exhaust air ABL) via the exhaust air connection 25 into the exhaust air tract 30 of the domestic power plant 500 and, in the further course (in FIG. 5 by way of example downwards), towards an additional blower 112. The additional blower 112 and power electronics 450 are arranged in a subspace TR2.

From there, the air volume flow L flows via the exhaust air tract 30 to the exhaust air connection 350, via which the storage battery 400, which is assigned to the domestic power plant 500 and, in the present example, arranged in the external housing, is integrated into the exhaust air tract 30 of the domestic power plant 500. In the further course, i.e. after the absorption of an undesired gas released in the storage battery unit 450 as well as of waste heat from the storage battery unit 450, the air volume flow L flows back into the building 550 via the exhaust air connection 350'.

From there, the air volume flow L flows to the catalytic combustor 350 in the subspace TR3 (in FIG. 5 by way of example downwards) and, in the further course, to the electrolysis unit 300 in the subspace TR4. This means that the subspaces TR2, TR3, TR4 are flown through serially. Finally, the air volume flow L flows past a hydrogen sensor 59 and from there into the second air tract 20 and through the heat exchanger 35 to the exhaust air connection 24, in order to be released as output air into the surrounding environment U through said output air connection 24.

The invention claimed is:

1. A domestic power plant, in particular for the self-sufficient energy provision of a residential building equipped with electricity and/or heat, comprising
a housing comprising an external air connection and an exhaust air connection,
a ventilation device comprising a heat exchanger, wherein the ventilation device is connected to the external air connection such that the external air can flow in a first air tract via the heat exchanger, or via an external air bypass past the heat exchanger, into a feed air tract of the domestic power plant, wherein the feed air tract runs at least partially within the housing,
an exhaust air tract, in which an air volume flow brought about by the ventilation device can be propagated within the housing,
a fuel cell unit, which is arranged within the housing and integrated into the exhaust air tract such that undesired gas released in the fuel cell unit can be diluted by the air volume flow and be removed together with waste heat from the fuel cell unit,
a storage battery unit which is preferably arranged in a housing and integrated into the exhaust air tract such that undesired gas released in the storage battery unit can be diluted by the air volume flow and be removed together with waste heat from the storage battery unit, and
a second air tract which is connected to the exhaust air tract, wherein the second air tract of the ventilation device is thermally coupled to the first air tract via the heat exchanger of the ventilation device such that it is possible for exhaust air via the second air tract to give off, as required and via the heat exchanger of the ventilation device, at least part of the thermal energy contained therein to the first air tract, and simultaneously the undesired gases diluted by the air volume flow can be expelled together with the air volume flow via the external air connection, so that the formation of explosive gas mixtures in the domestic power plant is avoided and the domestic power plant can be operated safely;
wherein exhaust air from at least one living space to be centrally ventilated is fed through the fuel cell unit via the exhaust air tract to the second air tract, and through the heat exchanger of the ventilation device to the exhaust air connection.

2. The domestic power plant according to claim 1, comprising a feed air connection and an exhaust air connection for connecting the domestic power plant to the at least one living space to be centrally ventilated such that an airflow flowing into the feed air tract of the domestic power plant can first be fed into the living space as feed air and that exhaust air from the living space can be propagated in the exhaust air tract of the domestic power plant.

3. The domestic power plant according to claim 1, wherein the housing comprises several separate subspaces coupled to each other via the exhaust air tract.

4. The domestic power plant according to claim 1, wherein the feed air tract is directly connected to the exhaust air tract.

5. The domestic power plant according to claim 1, wherein the fuel cell unit is exclusively air-cooled.

6. The domestic power plant according to claim 1, having an electrolysis unit which is arranged within the housing and integrated into the exhaust air tract such that undesired gas released in the electrolysis unit can be diluted by the air volume flow and removed together with waste heat of the electrolysis unit.

7. The domestic power plant according to claim 6, wherein the air flow which exits the fuel cell unit and may be fed as exhaust air into the second air tract of the ventilation device, is guided in such a way that it will only mix with the exhaust air from a respective living space after the latter has flowed through the electrolysis unit.

8. The domestic power plant according to claim 6, having a catalytic combustor downstream of the electrolysis unit in the air exhaust tract.

9. The domestic power plant according to claim 1, having a solar charge regulator, island inverter and/or DC/DC converter, which is integrated into the exhaust air tract.

10. The domestic power plant according to claim 1, wherein the fuel cell unit may be liquid-cooled and, at least intermittently, be thermally coupled to a hot water storage unit of the domestic power plant.

11. The domestic power plant according to claim 1, having a mixing region which is, at least intermittently, fluidly connected to the fuel cell unit such that the mixing region can absorb a flushing gas exiting the fuel cell unit, wherein the mixing region is connected to the ventilation device such that an airflow exiting the mixing region may be fed into the second air tract of the ventilation device as exhaust air.

12. The domestic power plant according to claim 1, wherein the fuel cell unit is connected to the ventilation device such that an airflow flowing into the feed air tract of the domestic power plant may also be fed as indirect feed air first of all into the fuel cell unit and via the latter, if need be, indirectly into the respective living space.

13. The domestic power plant according to claim 1, wherein the fuel cell unit is connected to the ventilation device and a respective living space such that an airflow exiting the fuel cell unit may, on the one hand, be fed as feed air into a respective living space, and/or, on the other, be fed as exhaust air into the second air tract of the ventilation device together with exhaust air from a respective living space.

14. A method for operating a domestic power plant, in particular a domestic power plant pursuant to one of the previous claims, comprising the steps of:
guiding outside air in a first air tract via a heat exchanger, or via an outside air bypass, past a heat exchanger, into a feed air tract of the domestic power plant,
propagating an air volume flow brought about by the ventilation device in an exhaust air tract of the domestic power plant, which runs at least partially within a housing of the domestic power plant,
diluting undesired gas released in the fuel cell unit by means of the air volume flow and removing the diluted gas together with waste heat from the fuel cell unit,
diluting undesired gas released in the storage battery unit by means of the air volume flow and removing the diluted gas together with waste heat from the storage battery unit, and
guiding exhaust air via a second air tract which is connected to the exhaust air tract, wherein the second air tract of the ventilation device is thermally coupled to the first air tract via the heat exchanger of the ventilation device such that it is possible for exhaust air expelled via the second air tract to give off, as required and via the heat exchanger of the ventilation device, at least part of the thermal energy contained therein to the first air tract, and simultaneously the undesired gases diluted by the air volume flow can be expelled together with the air volume flow via the external air connection, so that the formation of explosive gas mixtures in the domestic power plant is avoided and the domestic power plant can be operated safely;

wherein exhaust air from a living space is fed through the fuel cell unit via the exhaust air tract to the second air tract, and through the heat exchanger of the ventilation device to the exhaust air connection.

15. The method according to claim 14, wherein external air is fed from the external air connection by the first air tract through the heat exchanger and the feed air tract to the at least one living space.

16. The method according to claim 14, comprising the step of:
guiding outside air from outside a living space as direct feed air into the living space or, as indirect feed air, first via a gas-gas heat exchanger, which transfers heat and, if need be, humidity from the outgoing air into the feed air, and/or via a fuel cell unit and then into the living space.

17. The method according to claim 14, comprising the step of:
guiding exhaust air from the living space as a cooling and flushing volume flow for flushing and heat absorption via the components of the domestic power plant and, optionally, via an air-air heat exchanger for transferring heat and, if need be, humidity, into the feed air, in particular, prior to a removal of said exhaust air as outgoing air from the domestic power plant.

18. The method according to claim 14, comprising the step of:
guiding outside air from outside a living space as direct feed air into the domestic power plant, first of all via a gas-gas heat exchanger for preheating or, optionally, in case of high outside temperatures, in a bypass past said gas-gas heat exchanger, and using said outside air as a cooling and flushing volume flow for diluting and removing flammable gases as well as for the absorption of heat via the components of the domestic power plant.

19. The method according to claim 14, comprising the step of:
decoupling heat into a hot water storage unit via an air-water heat exchanger and/or an air-water heat exchanger of a heat pump; and/or
preheating the feed air via an air-air heat exchanger and removing the cooling and flushing volume flow as outgoing air form the domestic power plant.

20. The domestic power plant according to claim 1, wherein external air is fed from the external air connection by the first air tract through the heat exchanger and the feed air tract to the at least one living space.

* * * * *